United States Patent [19]

Frances et al.

[11] Patent Number: 5,209,877
[45] Date of Patent: May 11, 1993

[54] METHOD OF MAKING FIBRIDS

[75] Inventors: Arnold Frances, Wilmington, Del.; Lee J. Hesler, Richmond, Va.; James E. Van Trump, Wilmington, Del.; Rita M. Vasta, Vienna, W. Va.

[73] Assignee: E.I. Du Pont de Nemours and Company, Wilmington, Del.

[21] Appl. No.: 854,746

[22] Filed: Mar. 19, 1992

Related U.S. Application Data

[62] Division of Ser. No. 725,859, Jul. 2, 1991.

[51] Int. Cl.$^5$ ............................................... B29B 9/00
[52] U.S. Cl. ............................................. 264/9; 264/5; 264/140
[58] Field of Search ................... 264/5, 9, 28, 140; 162/146, 157.2, 157.3

[56] References Cited

U.S. PATENT DOCUMENTS

| | | | |
|---|---|---|---|
| 2,988,782 | 6/1961 | Parrish et al. | 18/48 |
| 2,999,788 | 9/1961 | Morgan | 162/146 |
| 3,756,908 | 9/1973 | Gross | 162/146 |
| 4,110,385 | 8/1978 | Sander et al. | 264/13 |
| 4,205,025 | 5/1980 | Hart et al. | 264/14 |
| 4,219,512 | 8/1980 | Sinn et al. | 264/11 |
| 4,224,259 | 9/1980 | Sander et al. | 264/11 |
| 4,237,081 | 12/1980 | Murphy et al. | 264/9 |
| 4,450,125 | 5/1984 | Voituron et al. | 264/12 |
| 4,519,873 | 5/1985 | Amano et al. | 162/138 |

FOREIGN PATENT DOCUMENTS 57-36167 2/1982 Japan.

*Primary Examiner*—Mary Lynn Theisen

[57] ABSTRACT

A thickener for liquids is disclosed. The thickener consists of organic polymer fibrid particles with a very small size, a very high aspect ratio, and very low bulk density. The thickener is made by drying newly-coagulated fibrid particles in a way that results in high particulate surface area.

3 Claims, 2 Drawing Sheets

METHOD OF MAKING FIBRIDS

This is a division of application Ser. No. 07/725,859, filed Jul. 2, 1991.

BACKGROUND OF THE INVENTION

1. Field of the Invention

This invention relates to a dry particulate thickener for liquids and to a process for making it. The thickener consists of organic fibrid particles having a very small size, a very high aspect ratio, and a very low bulk density. The process for making the thickener includes steps of drying coagulated fibrids in a way that results in a product with very high surface area.

2. Description of the Prior Art

U.S. Pat. No. 2,988,782, issued Jun. 20, 1961 on the application of Parrish et al., discloses the preparation and use of fibrids made from several synthetic polymers. While it is disclosed that the fibrids can be dried before use, the fibrids are made without regard to aspect ratio and are used almost exclusively in paper products. There is no mention of fibrids as thickening agents.

U.S. Pat. No. 2,999,788, issued Sep. 12, 1961, on the application of Morgan, discloses the preparation of synthetic polymer fibrids. There is no mention of using fibrids for liquid thickening purposes and there is little mention of using dried fibrids.

U.S. Pat. No. 4,519,873, issued May 28, 1985 on the application of Amano et al., discloses preparation of pulp-like aramid particles used to make papers for electrical insulation. The particles are made in an aqueous system and are used without drying. It is taught that the particles must have a freeness of less than 80 milliliters to be useful.

Japanese Patent Publication (Kokai) No. 36167/82, published Feb. 26, 1982, discloses the preparation of fibrids of, for example, aromatic polyamides, by means of shearing a precipitating liquid system of the polyamide. The fibrids are isolated from the liquid and are dried; and, then, they are ground into small particles. The publication states that previous attempts at making particles which would be effective thixotropic agents failed because the particles were too large and the wrong shape.

SUMMARY OF THE INVENTION

The present invention provides a dry fibrid of organic polymer exhibiting, microscopic, substantially sheet-like, structures with a surface area of 50 to 150 m²/g, a length or largest-dimension particle size of 10 to 1000 microns and preferably 10 to 25 microns, a shortest length or thickness of 0.05 to 0.25 microns, a resulting aspect ratio or largest-to-smallest dimension ratio of 40 to 20,000 and preferably 100 to 3000, and a Critical Concentration of 0.15 to 1%. The fibrid qualities are characterized en masse or as an average of a mass of fibrids taken together.

This invention also provides a process for making such fibrids wherein: a solution of organic polymer is added, with vigorous agitation, to a liquid which is a nonsolvent for the polymer and is miscible with the solvent of the solution to cause coagulation of fibrids; the coagulated fibrids are wet milled and separated from the liquid; the separated fibrids are dried by means appropriate to yield clumps of fibrids having a high surface area; and the clumps are opened to yield a particulate fibrid product.

Drying means which are appropriate for this invention are freeze-drying, critical-point drying, flash drying, and drying by use of a surfactant. Drying by use of a surfactant is preferred.

DETAILED DESCRIPTION OF THE INVENTION

Figure 1:
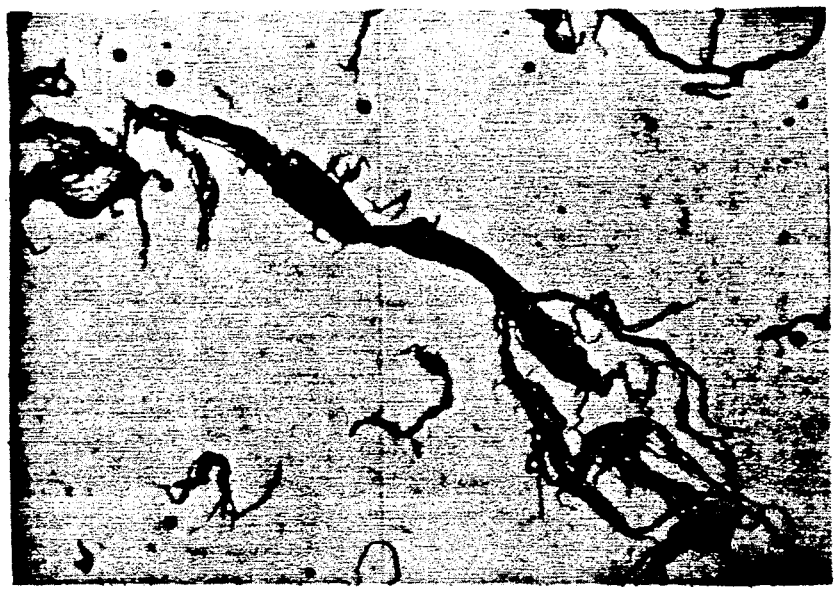
FIG. 1 is a photomicrograph, at 40X enlargement, of unrefined meta-aramid fibrids which can be further treated to make the dried fibrid product of this invention.

There has long been a need for a dry, particulate, liquid thickener which has small size, high aspect ratio, and sheet-like configuration. It has been known that particles having large ratios of largest-to-smallest dimension (large aspect ratios) are likely to exhibit good liquid thickening performance and it was expected that a sheet-like shape should permit a thin, flat, structure when dried from a dispersion. It has been relatively easy to make particles of high aspect ratio, although the particles have, in the past, had a large size and have possessed the shape of a low density fiber. That is, such particles have had the shape of a sheet rope or a collapsed sheet having a high inner void volume with low external surface area. Such particles, when dried, have generally been more than 1000 microns in largest dimension and the surface area of such particles has, generally, been less than 40 m²/g, when dried. Large, fiber-like, particles having large aspect ratios and small surface areas can easily be made by well-known fibridation techniques; and very small particles with low aspect ratios can be made by emulsion processes and by grinding or refining larger particles. Fibridation techniques yield, generally, fiber-like particles which cannot be dried without severe change in surface area; and small particle techniques (including grinding and refining) yield, generally, spherical particles.

By the process of the present invention, a dry, particulate, product is provided which exhibits both, a predominantly two dimensional structure and a large surface area and aspect ratio. While the large surface area is not critical to the function of the product, it is inherent in two dimensional structure, large aspect ratio, and ready dispersibility.

Fibrids are made by pouring together, under vigorous agitation, a solution of polymer and a liquid which is miscible with the solvent of the polymer solution and in which the polymer is not soluble. The liquid causes precipitation of the polymer and the agitation causes a fine dispersion of the polymer, when precipitated. The fibrids, dispersed in the liquid of the precipitating system, are rinsed with and dispersed in water and are, then, wet milled to the desired particle size. After the wet milling, the fibrids are isolated and dried in accordance with the drying techniques described herein.

The fibrids of this invention are made from organic polymers and are preferably made from aromatic polyamides. The term "aromatic polyamide" as used herein is defined as a polymer wherein the amide group, that is, the

—CO—NR— radical where R is hydrogen or alkyl of 1-6 carbon atoms, of each repeating unit is linked through the nitrogen and the carbon atom to a carbon atom in the ring of separate aromatic ring radicals The term "aromatic ring" is defined herein as a carbocyclic ring possessing resonance.

The aromatic polyamides may be prepared by reacting an aromatic diacid chloride with an aromatic diamine. The carboxyl groups of the diacid chloride and the amino groups of the diamine can be oriented ortho-, para-, or meta- relative to each other, with meta-orientation being preferred. Substituents such as lower alkyl, lower alkoxy, halogen, nitro, low carbalkoxy, or other groups (e.g., sulfonate) which do not form a polyamide during polymerization, may be attached to the aromatic ring nuclei. Preferably, however, the diamine and diacid will be entirely aromatic, i.e., unsubstituted, resulting in a polymer wherein the units linked by the amide group are wholly aromatic.

Suitable polyamides are described in greater detail in U.S. Pat. No. 3,094,511 and British Patent 1,106,190. A preferred aromatic polyamide is poly(meta-phenylene isophthalamide). The polyamides employed will preferably have an inherent viscosity of about 1.2 to 2.0 when measured at 25° C. in N,N-dimethylacetamide containing four percent lithium chloride based on the weight of the solution, at a concentration of 0.5 gram of polyamide per 100 cc of solution.

The process of the present invention relates to wet milling as-fibridated fibrids to reduce the longest dimension and open the structure followed by drying an aqueous dispersion of the fibrids in such a manner that the individual fibrid particles are not strongly bound together or recollapsed into a fiber-like particle; and then opening those dried fibrids using energy less than that which will cause fracturing and consequent severe reduction of the fibrid aspect ratio. The ultimate particle size of the fibrids is not appreciably altered by the opening forces used to separate the fibrids of this invention. Among the eligible means for drying the fibrids can be listed surfactant treatment, freeze-drying, critical point drying, and flash drying.

In freeze drying, a sample slurry of fibrid particles and carrier is initially frozen in a chamber under evacuation. Heat to the evacuated chamber is limited so that energy loss due to carrier (normally water) sublimation from the sample is sufficient to keep the sample frozen until substantially all of the carrier is sublimed off leaving dry fibrids which, since they have never been subjected to the surface tension generated compressive stresses encountered in drying from liquid, are substantially unchanged from the never-dried form.

Critical point drying is accomplished by drying from any carrier in a temperature and pressure regime such that the carrier never passes through a liquid/vapor phase change. The carrier is normally $CO_2$ since $CO_2$ has a convenient critical point. The liquid of the never-dried fibrid slurry is generally exchanged with methanol, first, and, then, with acetone by slurrying the fibrids in the desired exchange carrier and filtering repeatedly (4–5 times). When the fibrid is in a substantially acetone slurry, the material is placed in a steel bomb and liquid $CO_2$ added, slurried, and drained repeatedly until substantially all of the acetone has been replaced by liquid $CO_2$. The pressure on the bomb is then raised to above the critical pressure, the temperature to above the critical temperature, and both are maintained during bleed of the $CO_2$ from the vessel. Eventually, essentially all $CO_2$ has been released and the resultant fibrid mass is substantially dry without ever having passed through the surface tension generated compressive stresses encountered in drying from a liquid. The fibrid is therefore substantially unchanged from the never-dried form.

Flash drying is accomplished by elevating the temperature of a fibrid slurry, while under pressure, to a temperature below the boiling point of the carrier liquid at that pressure but sufficiently high that the latent heat of the system exceeds the heat of vaporization of the carrier liquid present. Upon abrupt pressure release, the liquid converts substantially completely to vapor without the generation of significant liquid/vapor interface.

In a preferred embodiment, the fibrids are treated with an appropriate kind and amount of surfactant either before or after additional water washing; and, then, the fibrids are isolated from the vehicle liquid by filtration or centrifugation or the like, and, dried. Eligible surfactants can include anionic, cationic, nonionic, and amphoteric. There appears to be little, if any, difference in the results obtained from the use of different surfactants.

Drying the surfactant-treated fibrids can be conducted in any of several well known ways. For example, a filter cake of the fibrids can simply be broken into clumps and dried in an oven, or the clumps can be dried in a vacuum with heat or cold.

Once dried, the clumps of fibrids can be opened or separated to their ultimate particle size by relatively gentle opening forces. The clumps can be opened at low power settings in mixers, such as Waring Blendors, or in turbulent air grinding mills, such as the devices known as Turbomills or Ultra Rotors. Care must be exercised, of course, to assure that the clumps are not subjected to forces which are so vigorous that the individual fibrids are appreciably broken or attrited, thus reducing their aspect ratio. The extent of fibrid attrition can be determined by comparing the aspect ratio of fibrids before wet milling with the aspect ratio of fibrids after opening the dried fibrids to their ultimate particle size.

Fibrid particles of this invention are extremely effective as thickening agents. They are small enough to be used clog-free in liquids which must be processed though equipment with fine clearances, and their substantially two dimensional shape provides the qualities necessary to produce thickened liquids of homogeneous consistency capable of producing thin films such as is required in paints and other coatings.

Of the properties which are used to characterize small particles, those which appear to be most important for characterization of the fibrid particles of this invention are length, sheet-like shape, aspect ratio, surface area, and Critical Concentration.

The effectiveness of a particle as a thickener is determined, in large part, by the efficiency of random packing of the particle. This is, in turn, a function of the aspect ratio and rigidity of the particle and can be readily measured by a settling test (Critical Concentration). It has been stated that random packing in settling is a function of the aspect ratio of the fibrids and, for this invention, the aspect ratio should be from about 40 to 20,000 and, preferably, from about 100 to about 3000. Fibrid particles of the kind and shape of this invention are most effective with an aspect ratio in that range.

The aspect ratio can be defined as the ratio of the length, or longest dimension, to the smallest dimension of individual fibrid particles. The length can be defined as the longest projected dimension of a particle. That is, the length is taken to be the longest external dimension of the particle. As stated, the particles of this invention are small enough that they can be used to make thickened liquids of uniform consistency. Such uses demand that the length of the particles should not be greater than about 1000 microns. Because of the need for a high aspect ratio, the length should not be less than about 10 microns.

In the case of the fibrids of this invention, the smallest particle dimension is the thickness of the fibrid material. The fibrids of this invention, are in the form of very small sheets of polymeric material; and the smallest dimension is the thickness of the sheet, itself. The thickness of the sheet is, generally, from about 0.05 to 0.25 micron; and is usually about 0.1 micron.

Figure 2:
FIG. 2 is a photomicrograph, at 40X enlargement, of the fibrids of FIG. 1 after wet milling and drying by the process of this invention. The particles shown in FIG. 2 are particles of this invention.
Figure 3:
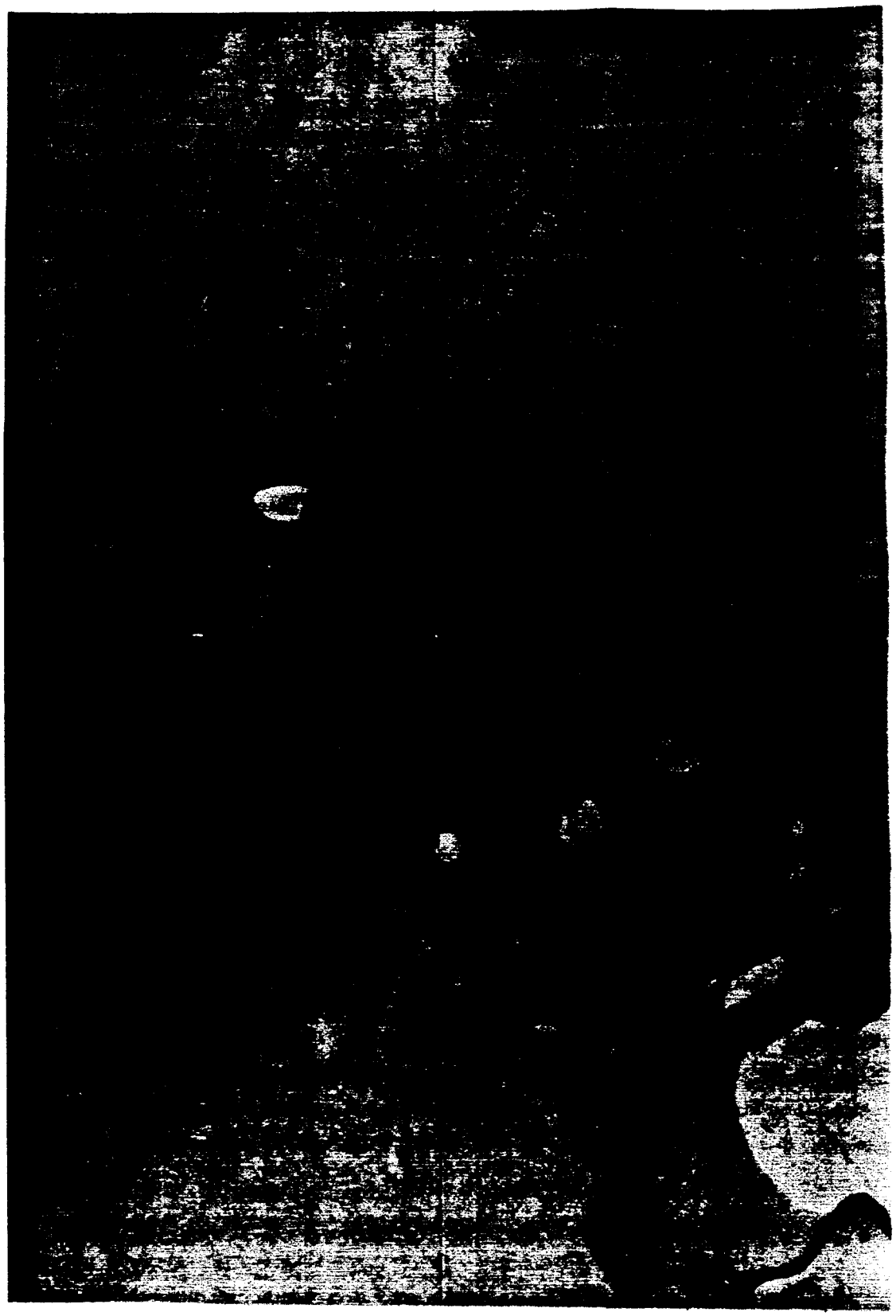
FIG. 3 is a photomicrograph, at 11,100X enlargement, of a cross section of a particle of this invention.

Referring to the Figures for a moment, FIG. 1 is a photomicrograph, at 40X enlargement, of unrefined meta-aramid fibrids in a sheet rope form which are further treated by the process of this invention to yield the fibrid particles of this invention. The sheet rope of FIG. 1, as a result of wet milling and appropriate drying, is expanded to yield sheet-like fibrid particles such as are shown in FIG. 2. FIG. 2 is a photomicrograph, at 40X enlargement, of the meta-aramid fibrids of FIG. 1, after the process of this invention. FIG. 3 is a cross sectional view, at 11,100X enlargement, of the refined fibrid particles of FIG. 2. The lines represent the edges of fibrid particle sheets of this invention and the edges are about 0.1 micron thick.

Critical Concentration is the concentration of particles which is at substantial equilibrium after settling out of a liquid suspending agent. Critical Concentration is a measure of the degree to which particles will random pack when settled from liquid suspension; and it provides an indication of the effectiveness of particles in thickening a liquid. Critical Concentration is reported as volume % polymer in the volume of liquid suspending agent which includes the particles; and, for purposes of this invention, effective thickening particles exhibit critical concentrations of from about 0.15 to 1.0, preferably less than 0.75.

TEST METHODS

Freeness

Freeness is a well-known measure of the facility for water to drain from a slurry or dispersion of particles. Freeness is determined by TAPPI test T227m50. Data obtained from conduct of that test are expressed as Canadian Freeness Numbers, which represent the milliliters of water which drain from an aqueous slurry under specified conditions. A large number indicates a high freeness and a high tendency for water to drain. A low number indicates a tendency for the dispersion to drain slowly. Fibrids of this invention generally exhibit a freeness of less than 600 milliliters.

Particle Size

Length - The length is the average length of the fibrids and can be determined using any apparatus useful for such determinations. For the purposes of this invention, lengths were determined using a Fiber Length Analyzer, Model FS-100 sold by Kajaani, Inc., Norcross, Ga., USA.

Thickness - The thickness of the fibrids is the thickness of the individual sheet material which is present in the fibrids. Reference is made to FIGS. 2 and 3 wherein it can be seen that the fibrids are in the form of sheets and the thickness of the sheets are on the order of 0.1 micron. The thickness of the fibrids is determined by visual inspection of electron micrographs of a section of the fibrids.

The fundamental difference between the fibrids of this invention and the unrefined particles of the prior art is that the prior art particles are low density fiber-like bundles of material and the fibrids of this invention are sheet-like. It is an important element of the fibrids of this invention that the smallest functional dimension, for purposes of determining an effective aspect ratio, is the thickness of the sheet-like structure of the fibrids. The smallest functional dimension of the particles of the prior art is the distance across the fiber-like bundles. The difference between the thickness of the sheet-like structure of the fibrids of this invention and the distance across the fiber-like bundles of the prior art is about two orders of magnitude. The bundles are about 10 microns across and the sheet-like fibrids of this invention are about 0.1 micron thick. The shortest functional dimension in these particles is believed to define both the tendency for the particles to fuse on drying, and the thickness of layers which can be made in final products. The long axis defines pumpability of dispersions of the material, and the aspect ratio defines the thickening ability of the material.

Aspect Ratio

The aspect ratio of the fibrids is simply the ratio of the length to the smallest functional dimension - the thickness for the sheet-like fibrids of this invention and the diameter for fiber-like particles.

Surface Area

The surface area is the surface area as determined by the BET (Brunauer, Emmett, and Teller) method. For the purposes of this invention, surface areas were determined using a Surface Analyzer sold by Micromeritics Instrument Corp., Norcross, Ga. 30093, USA bearing a Model identification ASAP-2400.

Critical Concentration

To determine the Critical Concentration of particles, a sample of the particles is dispersed in a suspending liquid which has a lower density than the particles and which will wet the particles but not dissolve or swell them. The particles are permitted to settle until they have reached substantial equilibrium; and, using the volume of suspending liquid in which the particles are contained, the volume percent of particles is calculated. The lower the number, the more effective the particles will be as liquid thickeners.

The sample of particles is generally selected to be about 0.5 percent of the weight of the suspending liquid. The dispersion can be accomplished by hand mixing-;—care being exercised to exclude air bubbles from the dispersion. The suspending liquid which was used for the tests described herein is characterized as a light turbine oil having a density of 0.873 g/cc at 30° C. The sample of particles is dispersed in the turbine oil and the dispersion is placed in a flat-bottomed cylinder and allowed to settle for at least two days. At the end of the settling period, the height of the column of settled particles in the oil is used to calculate the volume percent of particles in that oil.

Viscosity

Use of the thickeners of this invention in liquids to yield suspensions causes most such suspensions to act in a Non-Newtonian manner. Determination of viscosities for such suspensions must be made using procedures and devices which take the Non-Newtonian effect into account. Using a Brookfield Model RVT Synchro-lectric Viscometer and a set of four LV cylindrical spindles, or the equivalent in a viscosity-measuring apparatus, the shear-viscosity relationship can be determined.

An appropriate sample of the test liquid is placed in a thermostatted pot with a diameter at least ten times greater than the diameter of the largest spindle and of sufficient depth to allow at least 2 centimeters of space between the bottom of the longest spindle and the bottom of the pot. This sample is allowed to equilibrate at the desired temperature. Tests are run for each spindle using a wide range of spindle speeds (rpm) to obtain at least two torque values for each spindle on a log-log representation of torque versus rpm.

Placing rpm on the y-axis and torque on the x-axis of a log-log representation of torque vs rpm, the slope of a straight line through the points obtained using a single spindle, can be taken as the shear thinning index (STI). The STI is generally 1.0 for Newtonian fluids and the introduction of thickeners causes an increase in the STI.

Once the STI is obtained, shear rate and apparent viscosity of a test liquid can be calculated from the following equations:

$$\text{Shear Rate (sec}^{-1}) = \frac{(\pi)(\text{rpm})(STI)}{15}$$

$$\text{Apparent Viscosity (Centipoises)} = \frac{(15)(F_{sr})(SC)}{(2\pi^2)(\text{rpm})(R_1^2)(L_{eff})(STI)}$$

where
$F_{sr}$ = fraction of full scale (reading/100)
SC = spring constant, (7187 dyne-cm for the test apparatus described herein)
$R_1$ = Spindle Radius
$L_{eff}$ = Calibrated Spindle Length The equations and values set out above are used with the Brookfield Viscometer identified herein. Procedures are described by M. R. Rosen in the Journal of Colloidal and Interfacial Science, Vol. 36, page 350 (1971). Of course, other devices and other procedures can be used to evaluate the results obtained by practice of this invention.

DESCRIPTION OF THE PREFERRED EMBODIMENTS

EXAMPLE 1 A dispersion of coagulated fibrids was prepared by the procedure set out in Example I of U.S. Pat. No. 3,756,908 wherein a solution of poly(metaphenylene isophthalamide) containing about 14% polymer was passed through a fibridator of the type described in U.S. Pat. No. 3,018,091. The solution included about 77.5% dimethylacetamide (DMAc), 2% water, and 6.5% calcium chloride. The polymer was precipitated in a liquid system having 30-40% DMAc, 58-68% water, and 2% calcium chloride. The resulting fibrids were washed by repeatedly redispersing them in water until the DMAc and calcium chloride concentrations were reduced to about 1.0% and 0.3%, respectively. Fibrids resulting from this procedure exhibited a particle length of 830 microns.

The dispersion of fibrids, with concentration adjusted under vigorous agitation to about 0.8%, was wet-milled in a Sprout-Waldron 36-2 disc refiner having plates set at −19 mils. The resulting refined fibrids exhibited a particle length of 290 microns.

Wet fibrids were isolated from the dispersion by filtration to yield a wet filter cake which was analyzed to be 6.0 weight percent fibrid solids.

One hundred grams of that wet filter cake (6 grams of fibrid) were mixed into about 2 liters of water having 0.9 gram of an anionic surfactant dissolved therein. The surfactant was a sulfonate-based surfactant sold by Witco, Inc. under the trademark designation "Witconate 93S". The mixture of particles was boiled for about 2 hours and was, then, filtered to a damp cake. That cake was reslurried in about 2 liters of deionized water and filtered once more. The resulting cake was broken into small pieces and dried for about 8 hours at about 100C in a vacuum to yield a bone dry product. To open the pieces of the cake into the ultimate particles, the pieces were milled for only about 10 seconds at high speed in a Waring Blendor. The resulting product had a surface area of 105 m$^2$/g, a length of about 290 microns, a thickness of about 0.1 micron, an aspect ratio of 2900, and a Critical Concentration of 0.73%.

As a comparison, the same procedure as described above was conducted on a second sample of the same fibrids but no surfactant was used in the treatment. The pieces of filter cake which were dried were very difficult to break up and very few ultimate particles were obtained in the dry milling. However, the particles which were obtained were tested and found to have a surface area of 36 m$^2$/g, a length of greater than 1000 microns which had to be estimated because it could not be measured using the Kajaani Fiber Length Analyzer. These particles were similar to the fiber-like bundles of the prior art with a smallest functional dimension of about 10 microns. The aspect ratio for these particles, using the estimated length and the estimated small dimension, was estimated to be about 100.

As a test of the effectiveness of thickening for the product of this example, an epoxy resin was loaded with 1 weight percent of the particles and was stirred for about 30 minutes to assure homogeneous distribution of the particles. As a comparison, the same thing was done using the comparison particles of this example. The viscosities of both of those dispersions were determined and compared with the viscosity of the epoxy resin having no particles. The epoxy resin was the material sold by Shell Chemical Company under the trademark designation "EPON 828". The viscosity of the epoxy resin without any particles was 5500 cps; and, with the control particles, the viscosity was 8100 cps. Using the particles of this invention, the viscosity was 46,800 cps. All values were determined at 30° C. and 1 sec$^{-1}$ shear rate. The relative viscosities—that is, the ratio of viscosities of epoxy with particles and epoxy without particles—is even more pronounced for less viscous liquids and for lower shear rates. However, at high shear rates, using the fibrids of this invention, the relative viscosities approach unity.

Test results are shown in the Table, below.

With regard to the thickening qualities of the fibrids of this invention, results similar to those reported above for relatively viscous epoxy resin were also obtained for less viscous epoxy resin, propylene glycol, and turbine oil. The fibrids of this invention are useful, generally, as thickeners in a large variety of liquids.

EXAMPLE 2 In this example, fibrids of substantially the same quality were treated in substantially the same way as the fibrids of Example 1, except that, the disc refiner was used with the plates set at −17 mils.

Test results are shown in the Table, below. Comparison particle sizes were the same as reported in Example 1.

EXAMPLE 3 In this example, fibrids from Example 1, above, were isolated and washed without using the surfactant. The fibrids were then dried by means of a freeze-drying process instead of by use of a surfactant. The filter cake of fibrids was placed in the chamber of a freeze-dryer; the temperature of the cake was reduced by means of an acetone/dry ice bath, and a vacuum was drawn on the chamber. The freezing temperature and the vacuum were maintained for about 24 hours—until the fibrids in the cake were dry. The cake was broken into individual fibrids by a short run in a Waring Blendor and the fibrids were tested.

Test results are shown in the Table, below.

EXAMPLE 4 In this example, dried fibrids from Example 3 were rewetted by being slurried in water and isolated by filtration to make a filter cake. The filter cake was, then, dried for about 8 hours at 100C in a vacuum. The individual fibrids were separated by a short run in a Waring Blendor and the fibrids were tested.

Test results are shown in the Table, below.

While the Critical Concentration for the fibrids of this example was greater than 1, it can be understood that fibrids of this invention, even when rewetted and dried using no special procedure, exhibit a Critical Concentration much lower than is exhibited by the Comparison Examples.

TABLE

| Example | Surface Area ($m^2/g$) | Length Microns | Aspect Ratio | Critical Conc (%) | Visc. cp @ $1s^{-1}$ | Freeness (ml) |
|---|---|---|---|---|---|---|
| 1 | 105 | 350 | 3500 | 0.73 | 46,800 | 505 |
| 1-Comp. | 36 | >1000 | ~100 | 2.96 | 8,100 | 780 |
| 2 | 101 | 330 | 3300 | 0.71 | 28,900 | 465 |
| 2-Comp. | 29 | >1000 | ~100 | 3.95 | 8,700 | 790 |
| 3 | 77 | 400 | 4000 | 0.70 | 37,300 | — |
| 4 | 53 | 400 | 4000 | 1.14 | 24,400 | 555 |

We claim:

1. A process to make dry fibrids of an organic polymer exhibiting, en masse, a surface area of 50 to 150 $m^2/g$, a largest-dimension particle size of 10 to 1000 microns, a largest-to-smallest dimension ratio of 40 to 20,000, and a Critical Concentration of 0.015 to 1% comprising the steps of:
   a) adding, with vigorous agitation, a solution of an organic polymer in a solvent to a liquid which is a nonsolvent for the polymer and is at least partially miscible with the solvent of the solution to cause coagulation of polymer fibrids;
   b) wet milling the coagulated fibrids;
   c) separating the wet milled fibrids from the liquid;
   d) drying the separated fibrids by adding a surfactant to the coagulated fibrids and then evaporating the solvent from the fibrids to yield clumps of fibrids having high surface area; and
   e) opening the clumps to obtain a particulate fibrid product.

2. A process to make dry fibrids of an organic polymer exhibiting, en masse, a surface area of 50 to 150 $m^2/g$, a largest-dimension particle size of 10 to 1000 microns, a largest-to-smallest dimension ratio of 40 to 20,000, and a Critical Concentration of 0.15 to 1% comprising the steps of:
   a) adding, with vigorous agitation, a solution of an organic polymer in a solvent to a liquid which is a nonsolvent for the polymer and is at least partially miscible with the solvent of the solution to cause coagulation of polymer fibrids;
   b) wet milling the coagulated fibrids;
   c) separating the wet milled fibrids from the liquid;
   d) drying the separated fibrids by freeze-drying, critical-point drying, or flash drying to yield clumps of fibrids having a high surface area; and
   e) opening the clumps to obtain a particulate fibrid product.

3. The process of claim 2 wherein the fibrids are dried by adding a surfactant to the coagulated fibrids and then drying the fibrids.

* * * * *